United States Patent
Alanen et al.

(10) Patent No.: US 11,184,070 B2
(45) Date of Patent: Nov. 23, 2021

(54) WIRELESS LOCATION-SENSING

(71) Applicant: Nokia Technologies Oy, Espoo (FI)

(72) Inventors: Olli Alanen, Vantaa (FI); Mika Kasslin, Espoo (FI); Janne Marin, Espoo (FI); Veli-Matti Kolmonen, Espoo (FI); Enrico Henrik Rantala, Berkeley, CA (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/150,727

(22) Filed: Jan. 15, 2021

(65) Prior Publication Data
US 2021/0218448 A1 Jul. 15, 2021

(30) Foreign Application Priority Data

Jan. 15, 2020 (FI) ...................................... 20205033

(51) Int. Cl.
*H04B 7/06* (2006.01)
*H04W 64/00* (2009.01)

(52) U.S. Cl.
CPC ......... *H04B 7/0617* (2013.01); *H04B 7/0634* (2013.01); *H04W 64/006* (2013.01)

(58) Field of Classification Search
CPC .. H04B 7/0617; H04B 7/0634; H04W 64/006
See application file for complete search history.

(56) References Cited

U.S. PATENT DOCUMENTS

| 10,461,821 | B1 | 10/2019 | Nammi et al. |
| 10,652,878 | B2* | 5/2020 | Costa ................... H04L 5/0053 |
| 10,856,252 | B2* | 12/2020 | Han ........................ G01S 3/48 |
| 2014/0010197 | A1* | 1/2014 | Wang ................... H04J 11/0033 370/329 |
| 2018/0175960 | A1* | 6/2018 | Fodor ................... H04L 5/0035 |
| 2019/0097712 | A1 | 3/2019 | Singh et al. |

(Continued)

FOREIGN PATENT DOCUMENTS

| EP | 3 491 866 | 6/2019 |
| JP | 2020005121 A | 1/2020 |

(Continued)

OTHER PUBLICATIONS

Youssef, M. et al., "Challenges: Device-free Passive Localization for Wireless Environments", MobiCom'07, Sep. 9-14, 2007, Montreál, Québec, Canada, 8 pages.

(Continued)

*Primary Examiner* — Jean B Corrielus
(74) *Attorney, Agent, or Firm* — Tong, Rea, Bentley & Kim LLC

(57) ABSTRACT

This document describes a solution for sensing a location by using a wireless network. According to an aspect, a method for an access node of the wireless network comprises: receiving, by the access node from a wireless device at a location, a channel measurement signal; determining, by the access node, precoding coefficients for the location based on the channel measurement signal; storing, by the access node, the precoding coefficients as linked to the location; and utilizing, by the access node, the preceding coefficients to acquire information on the location.

14 Claims, 9 Drawing Sheets

(56) References Cited

U.S. PATENT DOCUMENTS

2019/0158982 A1  5/2019  David
2019/0182793 A1  6/2019  Meng et al.
2019/0387491 A1* 12/2019 Han ......................... G01S 1/20

FOREIGN PATENT DOCUMENTS

| JP | 2021503072 A | 2/2021 |
| WO | 2017184043 | 10/2017 |
| WO | 2018141686 | 8/2018 |
| WO | WO 2018/204793 A1 | 11/2018 |
| WO | WO 2019/095060 A1 | 5/2019 |

OTHER PUBLICATIONS

Jiang, H. et al., "Smart Home Based on WiFi Sensing: A Survey", IEEE Access vol. 6, 2018, Digital Object Identifier 10.1109/ACCESS.2018.2812887, 9 pages.
Office Action and Search Report for Finnish priority application No. 20205033 dated May 8, 2020, 9 pages.
Japanese Office Action mailed in corresponding JP2021-003977 dated May 11, 2021, 7 pages.
European Office Action mailed in corresponding EP21151134.0 dated Apr. 21, 2021, 11 pages.

* cited by examiner

WIRELESS LOCATION-SENSING

CROSS-REFERENCE TO RELATED APPLICATIONS

This application is based on and claims the benefit of Finland Patent Application No. 20205033, filed Jan. 15, 2020, which is hereby incorporated herein by reference in its entirety.

FIELD

Various example embodiments relate to wireless networks and, in particular, to perform location-sensing.

BACKGROUND

In the field of wireless communications, wireless devices may be used for sensorless sensing in addition to their conventional purpose of radio communications. The sensorless sensing refers to a scenario where an object is measured without a sensor dedicated only for sensing the object. It may be beneficial to in provide solutions enhancing the sensorless sensing.

BRIEF DESCRIPTION

According to an aspect, there is provided subject matter of independent claims. Dependent claims define some embodiments.

The embodiments and features, if any, described in this specification that do not fall under the scope of the independent claims are to be interpreted as examples useful for understanding various embodiments of the invention. Some aspects of the disclosure are defined by the independent claims.

According to an aspect, there is provided an apparatus for a wireless network, comprising means for performing: receiving, by the apparatus from a wireless device at a location, a channel measurement signal; determining precoding coefficients for the location based on the channel measurement signal; storing the precoding coefficients as linked to the location; and utilizing the precoding coefficients to acquire information on the location.

In an embodiment, the means are configured to build, by repeating said receiving, determining, and storing for multiple locations of the wireless device or another wireless device, a database mapping different precoding coefficients to said multiple locations.

In an embodiment, the means are further configured to perform said utilizing by setting precoding coefficients to at least one of a transmitter and a receiver in order to direct a radio beam to the location.

In an embodiment, the means are configured to acquire the information on the location when there is no wireless device detected at the location.

In an embodiment, the means are configured to acquire the information on the location by using a signal received from a transmitter at the location.

In an embodiment, the means are configured to wake up the transmitter to transmit the signal.

In an embodiment, the means are further configured to acquire the location of the wireless device by using a positioning system.

In an embodiment, the means comprise: at least one processor; and at least one memory including computer program code, said at least one memory and computer program code configured to, with said at least one processor, cause the performance of the apparatus.

According to an aspect, there is provided an apparatus for controlling a wireless network, comprising means for performing: controlling at least one access node of the wireless network to carry out a learning phase where the one or more access nodes receive, from at least one wireless device in at least one location, at least one channel measurement signal, determine precoding coefficients for said at least one location based on the at least one channel measurement signal, and store the precoding coefficients as linked to the at least one location; and controlling the at least one access node to carry out a sensing phase where the precoding coefficients are utilized to acquire information on the at least one location.

In an embodiment, the means are configured to acquire, from the at least one access node, information on the at least one location for which the precoding coefficients have been determined, to determine to sense the at least one location for one or more objects in the at least one location, and to perform said controlling the at least one access node to carry out the sensing phase on the basis of the determination.

In an embodiment, the means are further configured to control multiple access nodes to sense a location by setting precoding coefficients of a first access node to transmit a signal to the location and by setting precoding coefficients of a second access node to receive the signal from the location.

In an embodiment, the means are configured to select the first access node and the second access node on the basis of stored information on that both the first access node and the second access node have established the precoding coefficients for the location.

In an embodiment, the means are configured to cause the at least one access node to acquire the information on the location when there is no wireless device detected at the location.

In an embodiment, the means comprise: at least one processor; and at least one memory including computer program code, said at least one memory and computer program code configured to, with said at least one processor, cause the performance of the apparatus.

According to an aspect, there is provided a method for an access node of a wireless network, comprising: receiving, by the access node from a wireless device at a location, a channel measurement signal; determining, by the access node, precoding coefficients for the location based on the channel measurement signal; storing, by the access node, the precoding coefficients as linked to the location; and utilizing, by the access node, the precoding coefficients to acquire information on the location.

In an embodiment, the access node builds, by repeating said receiving, determining, and storing for multiple locations of the wireless device or another wireless device, a database mapping different precoding coefficients to said multiple locations.

In an embodiment, the access node performs said utilizing by setting precoding coefficients to at least one of a transmitter and a receiver in order to direct a radio beam to the location.

In an embodiment, the access node acquires the information on the location when there is no wireless device detected at the location.

In an embodiment, the access node acquires the information on the location by using a signal received from a transmitter at the location.

In an embodiment, the access node wakes up the transmitter to transmit the signal.

In an embodiment, the access node acquires the location of the wireless device by using a positioning system.

According to an aspect, there is provided a method for controlling a wireless network, comprising: controlling at least one access node of the wireless network to carry out a learning phase where the one or more access nodes receive, from at least one wireless device in at least one location, at least one channel measurement signal, determine precoding coefficients for said at least one location based on the at least one channel measurement signal, and store the precoding coefficients as linked to the at least one location; and controlling the at least one access node to carry out a sensing phase where the precoding coefficients are utilized to acquire information on the at least one location.

In an embodiment, the method comprises acquiring, from the at least one access node, information on the at least one location for which the precoding coefficients have been determined, to determine to sense the at least one location for one or more objects in the at least one location, and to perform said controlling the at least one access node to carry out the sensing phase on the basis of the determination.

In an embodiment, the method comprises controlling multiple access nodes to sense a location by setting precoding coefficients of a first access node to transmit a signal to the location and by setting precoding coefficients of a second access node to receive the signal from the location.

In an embodiment, the method comprises selecting the first access node and the second access node on the basis of stored information on that both the first access node and the second access node have established the precoding coefficients for the location.

In an embodiment, the method comprises causing the at least one access node to acquire the information on the location when there is no wireless device detected at the location.

According to an aspect, there is provided a computer program product embodied on a distribution medium readable by a computer and comprising a computer program code that, when executed by the computer, causes execution of a computer process for an access node of a wireless network, the computer process comprising: receiving, by the access node from a wireless device at a location, a channel measurement signal; determining, by the access node, precoding coefficients for the location based on the channel measurement signal; storing, by the access node, the precoding coefficients as linked to the location; and utilizing, by the access node, the precoding coefficients to acquire information on the location.

According to an aspect, there is provided a computer program product embodied on a distribution medium readable by a computer and comprising a computer program code that, when executed by the computer, causes execution of a computer process for a controller of a wireless network, the computer process comprising: controlling at least one access node of the wireless network to carry out a learning phase where the one or more access nodes receive, from at least one wireless device in at least one location, at least one channel measurement signal, determine precoding coefficients for said at least one location based on the at least one channel measurement signal, and store the precoding coefficients as linked to the at least one location; and controlling the at least one access node to carry out a sensing phase where the precoding coefficients are utilized to acquire information on the at least one location.

One or more examples of implementations are set forth in more detail in the accompanying drawings and the description of embodiments.

LIST OF DRAWINGS

Some embodiments will now be described with reference to the accompanying drawings, in which FIG. 1 illustrates an example radio communication system to which embodiments of the invention may be applied;

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Reference numbers, both in the description of the example embodiments and in the claims, serve to illustrate the embodiments with reference to the drawings, without limiting it to these examples only.

The embodiments and features, if any, disclosed in the following description that do not fall under the scope of the independent claims are to be interpreted as examples useful for understanding various embodiments of the invention.

Figure 1:
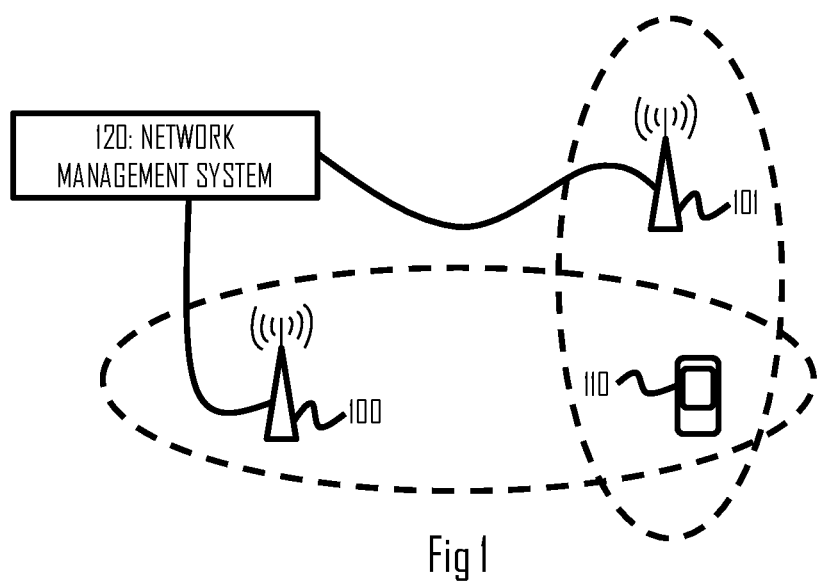

A general wireless communication scenario to which embodiments of the invention may be applied is illustrated in FIG. 1. FIG. 1 illustrates wireless communication devices comprising a plurality of access nodes (AN) 100, 101 and a wireless terminal station (STA) 110. Each AN may be associated with a basic service set (BSS) which is a basic building block of an IEEE 802.11 wireless local area network (WLAN). The most common BSS type is an infrastructure BSS that includes a single AN together with all STAs associated with the AN. The AN may be a fixed AN or it may be a mobile AN. The ANs 100, 101 may also provide access to other networks, e.g. the Internet. In another embodiment, the BSS may comprise a plurality of ANs to form an extended service set (ESS), e.g. the AN 110 or 112 may belong to the same ESS with another AN and have the same service set identifier (SSID). While embodiments of the invention are described in the context of the above-described topologies of IEEE 802.11 based networks, it should be appreciated that these or other embodiments of the invention may be applicable to networks based on other specifications, e.g. different versions of the IEEE 802.11, WiMAX (Worldwide Interoperability for Microwave Access), UMTS LTE (Long-term Evolution for Universal Mobile Telecommunication System), a fifth generation cellular communication system (SG) and other networks having cognitive radio features, e.g. transmission medium sensing features and adaptiveness to coexist with radio access networks based on different specifications and/or standards. Some embodiments may be applicable to networks having features defined in the IEEE 802.19.1 specification. One example of a suitable communications system is the SG system, as mentioned above. Some embodiments may work in licenced and/or in unlicensed spectrum.

Wireless communication systems may be used in sensorless sensing. In sensorless sensing, one may use wireless transmissions and their characteristic to distort in a radio channel due to, for example, objects and changes in position, direction and posture of the objects. These distortions may be measured and, from these measurements, characteristics such as motion, object location, object classification, object identification, measure vital signs and activity of the object may be determined. In the measurement of these distortions, one may use for example a CSI (Channel State Information) or an RSS (Received Signal Strength) or both. Wireless transmissions may be, for example, radio waves, microwaves, infrared, visible light, ultraviolet, X-rays and gamma-rays. Different waves can be used for example to cameras, microphones and dedicated sensors for motion, temperature and oxygen.

Traditionally, the transmitted signals of radio communication systems propagate towards all directions. In recent years, multiantenna ANs have been taken into use. These multiantenna ANs take advantage of e.g. various beamforming technologies. In these technologies the signals of the individual antenna elements are manipulated so that the communication capacity between the AN and the STA is improved by using beamforming and spatial diversity. Multiple spatially orthogonal communication may be established between the AN and the STA by using beamforming techniques, thus improving the capacity. Beamforming is used as a mechanism to focus a radio beam to a desired direction instead of omni-directional transmission. The parameters of the radio beam are defined by precoding coefficients that determine a beam direction and beam width, for example. The precoding coefficients define gain and phase weights for signals in transmission/reception antennas of a wireless device, e.g. the AN. Accordingly, the beamforming is applicable to both transmission and reception of signals.

The access node 100, 101 may be connected to a network management system (NMS) 120 which may comprise an apparatus configured to control the ANs 100, 101. The NMS may configure the ANs to sense a certain area. The NMS determines the transmitting and receiving AN. An example scenario is that access nodes of an enterprise are all controlled by the same NMS 120. In an embodiment, the network management system 120 is comprised in one of the access nodes, e.g. in the access node 100. In another embodiment, the network management system is realized by an apparatus different from the access nodes, e.g. by a server computer to which the access nodes may connect via a wired or wireless connection. In yet another embodiment, the network management system is realized as a distributed system in which multiple access nodes, e.g. access nodes 100, 101, have network management system elements which collaborate for related decisions. The network management system elements may be integrated into each access node.

The access nodes 100, 101, etc. and the NMS 120 may be comprised in a sensing system configured to carry out the above-described sensing in the area. The sensing may be performed for a purpose other than communicating with the STAs, as described above. The purpose may be to scan for one or more objects in a desired location in the area or to measure the one or more objects in the desired location. One characteristic distinguishing the scanning from conventional scanning of a channel or even location for wireless devices is that in the present scanning the object-of-interest (e.g. a human or another non-electronic object) does not emit radio signal(s) by itself. Instead, the object-of-interest distorts radio signals emitted to and/or received from the location of object through absorption, diffraction, and/or dispersion. These distortions may be measured from a radio signal received from the location, and characteristics of the object-of-interest may be computed on the basis of the observed distortion or a gradient of the distortion.

Figure 2:
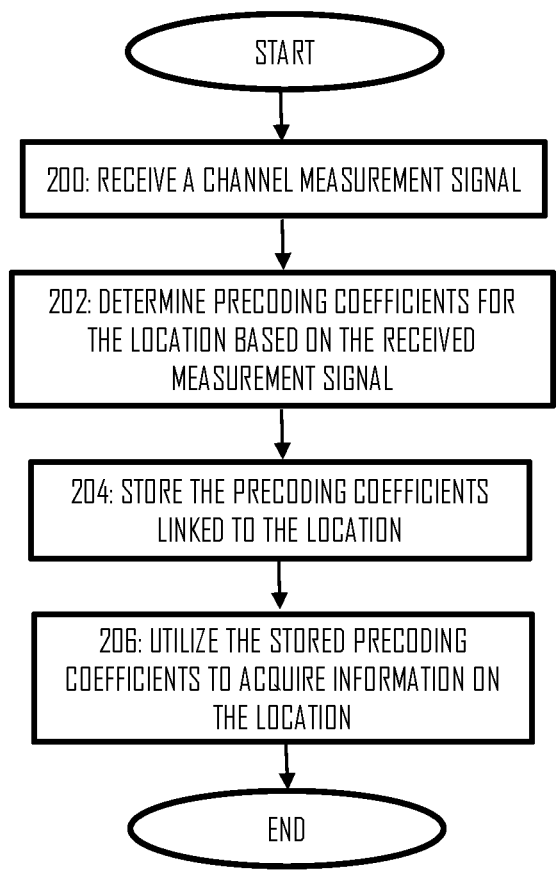
FIG. 2 illustrates a flow diagram for location-sensing according to an embodiment.

Referring to FIG. 2, let us describe an example of a process for acquiring information on the location. Let us assume that the location is in a coverage area of ANs 100 and 101, where also the STA 110 is located. The process comprises as performed by an apparatus for the AN 100 or 101: receiving (block 200), a channel measurement signal from the STA; determining (block 202) precoding coefficient for the location based on the received measurement signal; storing (block 204) the precoding coefficients as linked to the location; and utilizing the stored precoding coefficients to acquire information on the location.

Figure 3:
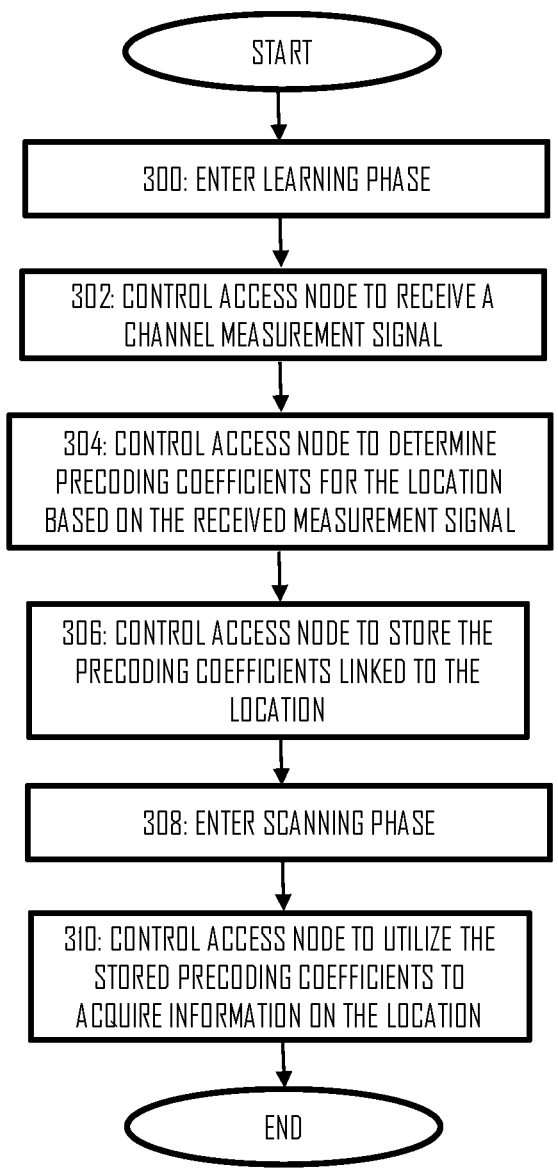
FIG. 3 illustrates a flow diagram for location-sensing according to another embodiment.

Referring to FIG. 3, let us describe another example of a process for acquiring information on the location. The process comprises as performed by an apparatus for a controller such as a controller in the NMS: entering (block 300) a learning phase; controlling (block 302), in the learning phase, AN 100 and/or 101 to receive a measurement signal from the STA 110; controlling (block 304) AN 100 and/or 101 to determine precoding coefficients for the location based on the received measurement signal from the STA 110; controlling (block 306) AN 100 and/or 101 to store the precoding coefficients linked to the location of the STA 110; entering (block 308) scanning phase; controlling (block 310), in the scanning phase, the AN 100 and/or 101 to utilize the stored precoding coefficients to acquire information on the location.

An advantage of the above-described embodiments is that the radio energy focused to the desired location improves accuracy of the information on the location. When the transmission and/or reception beam is focused to the location, the received signals represent better distortion of the signals at the location, i.e. characteristics of one or more objects at the location. Comparing with omni-directional transmission and/or reception where all objects around the transmitter and receiver affect the distortion, better accuracy can be achieved.

The location described above in connection with FIGS. 2 and 3 may be understood to cover a certain area that has dimensions that depend on the precoding coefficients, i.e. the characteristics of the radio beam that is used to sense the location. If the sensing radio beam is wide at the location-of-interest, the area of the location-of-interest is also larger than in a case where the radio beam is narrow. In any case, the area covered by the location may be understood to be non-zero. The location is typically a sub-area in the area covered by the system, and the sub-area is defined by the precoding coefficients.

Figure 4:
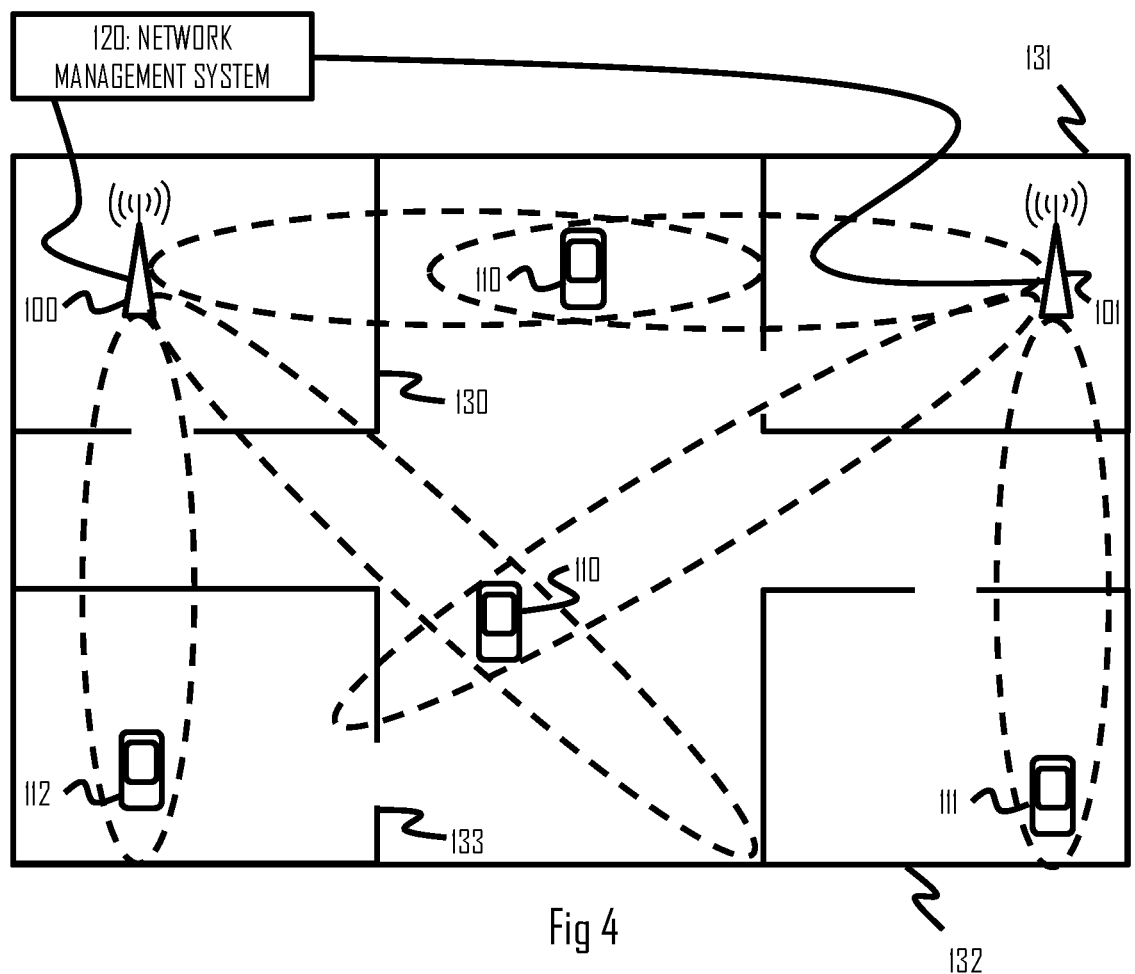
FIG. 4 illustrates an example a radio environment to which embodiments of the invention may be applied.

FIG. 4 illustrates an example embodiment on how the ANs and STAs may be located in a certain space and how the acquirement of the information on the location may occur. Here the ANs 100, 101 are located so that they together cover a determined area, where the STAs may be located and where the scanning of objects is performed. When the AN and the STA communicate, the AN receives a measurement signal from the STA at a location in the area. The measurement signal may be a pilot signal or a reference signal from which channel characteristics can be measured. Based on the measurement signal, the AN is capable of measuring the channel and determining precoding coefficients for the location, thus being capable of directing a radio beam to that specific location. The exact computation of the precoding coefficients from the received measurement signal may be made by using state-of-the-art channel estimation methods. The STA can send measurement signal to one AN or to several ANs. When the precoding coefficients are determined, the AN links the precoding coefficients with the location of the STA.

The location of the STA at the time of transmitting the measurement signal can be determined by the AN, for example from the received measurement signal by measuring the signal strength and angle of arrival. By using these parameters and the location of the AN, the AN or the NMS may estimate the location of the STA. In another embodiment, the STA may comprise a positioning system such as a GPS (Global Positioning System) receiver or magnetometer that can be used at the STA to determine the location of the STA. The location information may then be sent to the AN in connection with the measurement signal. In yet another embodiment, external positioning system may be employed for the positioning of the STA at a determined time. There exists a number of different positioning systems based on different technologies, and any of them may be employed in the learning phase. The location of the STA can also be pre-determined so that the measurement signal is sent in a certain location at a certain time. The measurement of the precoding coefficients may be repeated for multiple location of the STA 110 and/or for other STAs 111, 112. The end result is a radio map with precoding coefficients mapped to multiple locations in the area and at the set of ANs so that the precoding coefficients are available for use in sensing area.

It is advantageous that the learning phase is performed such that the area is substantially covered by the locations to which the precoding coefficients have been computed, i.e. that the radio map substantially covers the area in such manner that at least desired locations or sub-areas of the area are covered. FIG. 4 illustrates the area with a number of sub-areas 130 to 133. The learning phase may be performed for all sub-areas 130 to 133, for example. However, it is not mandatory to cover the whole area during the learning phase, and covering only certain areas-of-interest may be sufficient.

Let us now describe some embodiments for carrying out the training phase in such manner that the mapping is performed for a sufficient number of locations in the area. One example to generate this radio map employ a STA comprised in a device that is known to travel across the area, e.g. a robot vacuum. Modern robot vacuums include a Wi-Fi STA that can be connected to the ANs 100, 101. A robot vacuum is known to store and travel a predetermined route that covers the whole area. At certain location intervals, the robot vacuum may be configured to send a measurement signal to the AN(s). The route and the transmission intervals may be stored in the AN(s) and the STA so the location of the STA is known to the AN at the time of receiving each measurement signal, and no transmission of the location information may be needed. The AN links the measured signal and precoding coefficients to the predetermined location. These precoding coefficients linked to the location can then be stored either in the AN or in the NMS. Additionally, the map may indicate the set of preferred ANs to be used in a certain location. In another embodiment, the AN(s) may detect motion of the STA and request the STA to transmit the measurement signal at the different locations.

In another embodiment, patterns in behaviour of the STAs may be employed and used for the learning phase. For example, if the STA is known to be a mobile phone and the user of the mobile phone has a habit of having the mobile phone on a bedroom table every night, such information may be used to trigger the measurement of the precoding coefficients to the location of the bedroom table.

Figure 5:
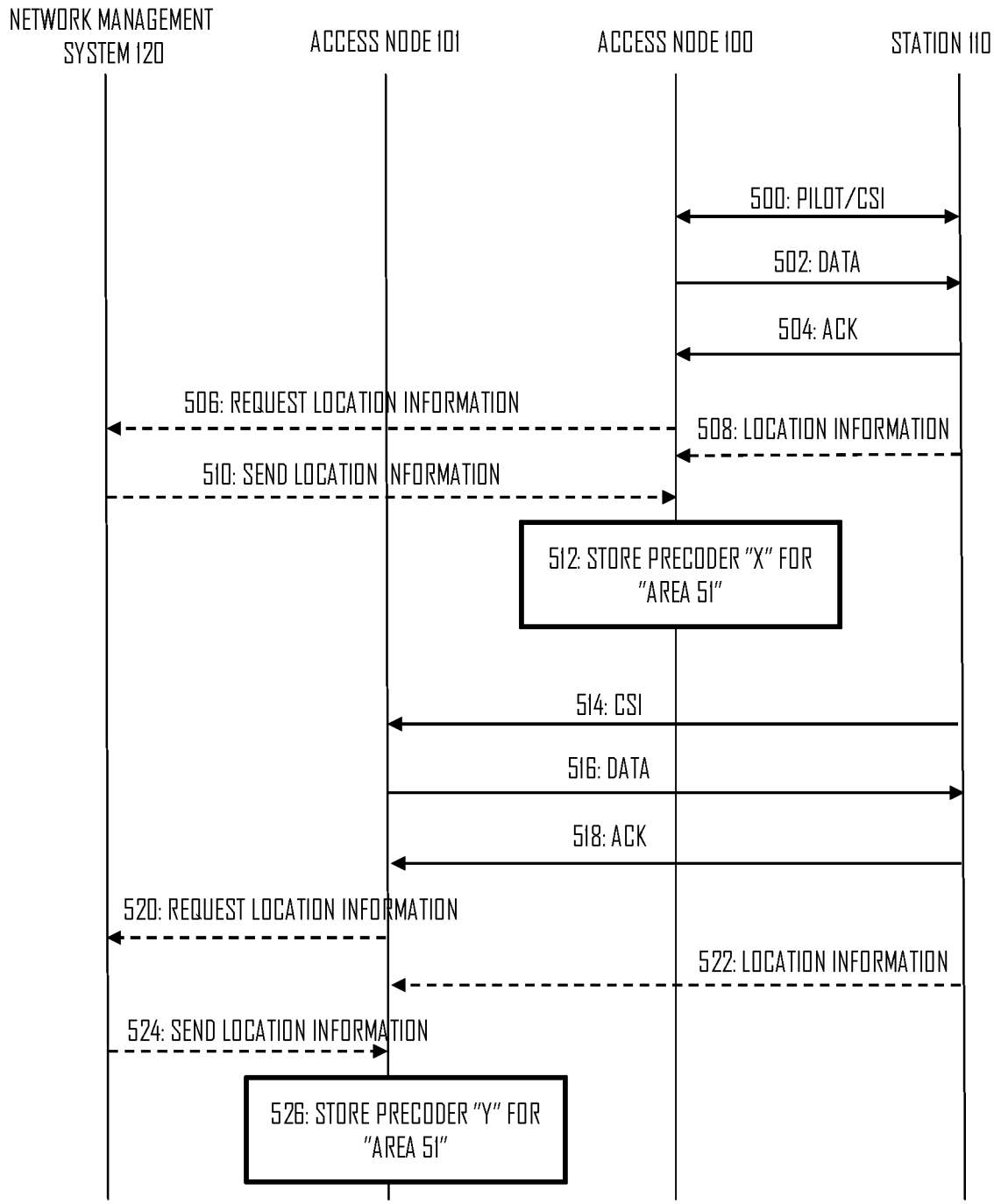
FIG. 5 illustrates a signaling diagram of a learning phase according to an embodiment.

FIG. 5 illustrates a signalling diagram of an embodiment where the ANs generate the radio map during the learning phase. During communication between the AN 100 and STA 110, the AN 100 determines the precoding coefficients based on the measurement signal received from the STA (step 500). Step 500 may comprise the STA 110 transmitting a pilot signal or a reference signal to the AN 100, and the AN 100 measuring the signal and determining the precoding coefficients on the basis of the measured signal. In another embodiment, step 500 comprises the AN 100 transmitting the pilot signal or the measurement signal to the STA 110 and the STA measuring the signal and determining channel state information (CSI). The CSI may comprise a channel matrix or, generally, information enabling the determination of the precoding coefficients. The STA 110 may then transmit the CSI to the AN 100 in step 500, and the AN 100 may compute the precoding coefficients from the received CSI. In yet another embodiment, the STA 110 may compute and transmit the precoding coefficients to the AN in step 500. The above-described channel measurement signal may thus be the pilot/reference signal or the CSI, depending on the embodiment.

The STA may also send its location information to the AN (step 508), or the AN can acquire it from the NMS (steps 506, 510), or the AN may use another positioning system or mechanism, as described above. After the location information is provided to the AN, the AN stores the location information associated with the calculated precoding coefficients (block 512). In an embodiment, the precoding coefficients is stored in the NMS 120, or at least information on the location for which the precoding coefficients have been mapped is stored in the NMS 120 so that the NMS is aware of the capability of scanning the location.

The computation of the precoding coefficients may be computed in step 500 in connection with data transmission (Steps 502, 504) between the AN 100 and the STA 110. In this case, the precoding coefficients may thus have a dual purpose: directing transmission beam of a data frame (step 502) to the STA 110 and mapping the precoding coefficients to the location of the STA for another purpose, i.e. for sensing the location when the sensing phase is triggered. In other embodiments, the computation of the precoding coefficients may be carried out in a situation where there is no data transmission intended between the AN 100 and the STA 110 and, then, steps 502 and 504 may be omitted during the learning phase.

In the same manner, the other access node(s) 101 of the system may carry out steps similar to 500 to 512. For example, the AN 101 may perform steps 514 to 526 that correspond to steps 500 to 512. And as described above, the computation and storing the precoding coefficients may be repeated for multiple locations at each AN in order to acquire sufficient coverage for the sensing.

Figure 6:
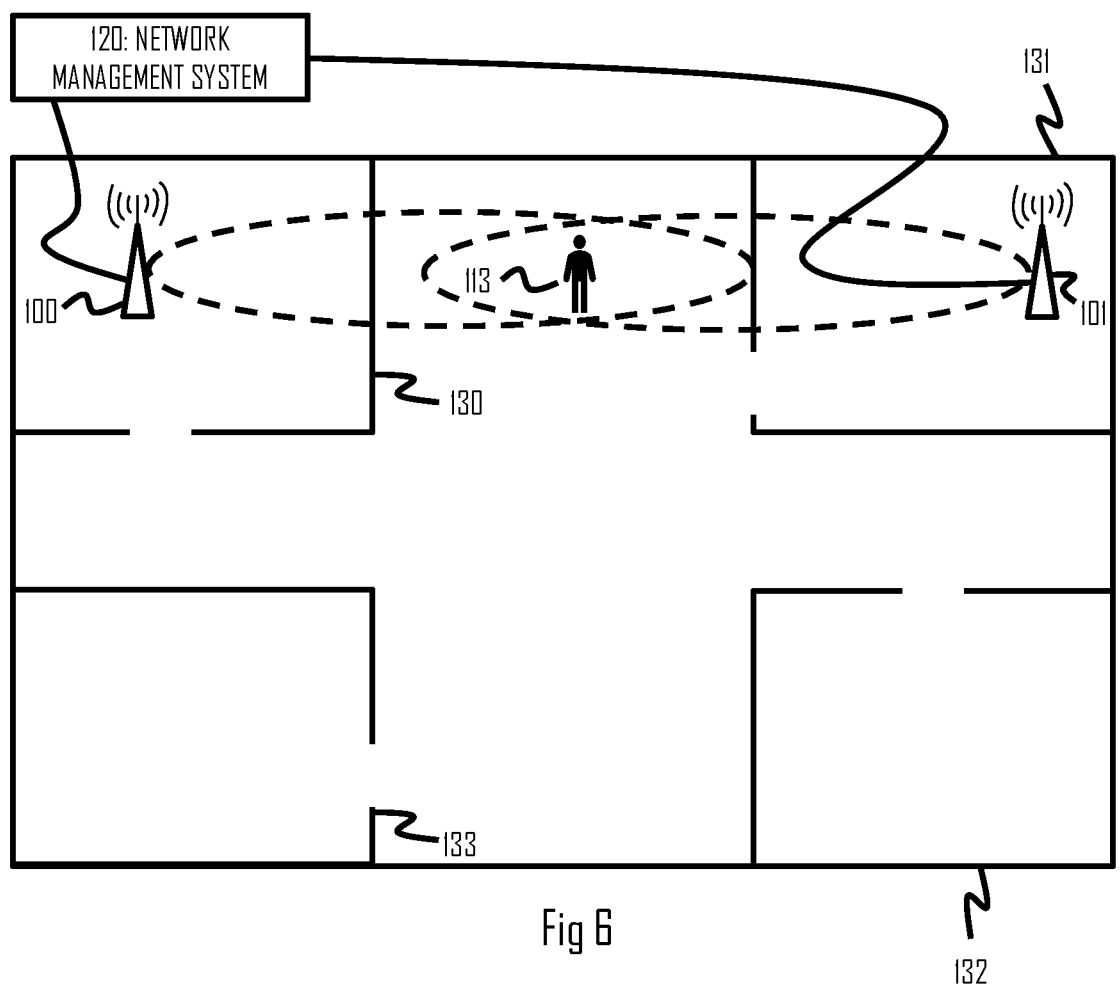
FIGS. 6 and 7 illustrate an embodiment for performing sensing directed to a location in a situation where there is no wireless device at the location.

When the location(s) have been mapped to the corresponding precoding coefficient(s), the sensing system is ready to scan the location(s). FIG. 6 illustrates an example of a radio system to which some embodiments may be applied. In the FIG. 6, the NMS 120 or another controller controls the ANs 100, 101 to acquire information from a certain location when there is no STA present at the location or at least no STA communicating with the ANs 100, 101. An object 113 such as a human, animal, furniture, etc may be present at the location, as illustrated in FIG. 6. The NMS 120 may initiate the sensing for the location, e.g. upon receiving a request to scan the location from an application server or another device that requests for information on one or more objects at the location. In another embodiment, the NMS may comprise an application layer that processes measurement data from the location and performs application-level analysis for the measurement data, e.g. identification of the object(s), determining motion of the object(s), analysis of vital signs from the object(s). The location may be selected on the basis of the request. For example, the AN may be configured to monitor one or more of the locations periodically as a part of an alarm system, for example. The alarm system may be a fire alarm system, a security alarm system etc. The sensing system may be also capable of, as an example, scanning different types of areas and/or sizes of areas. The system may, as an example, have the ANs 100, 101 initially configured to acquire information from a larger area of interest like the apartment or the office space in which the wireless communication system that is used for sensing purposes as well is operating. Information acquired with such a configuration may be used by the sensing system to make the NMS 120 to trigger, as an example, sensing for one or more locations within that larger area. Accordingly, The controller or the NMS may first trigger the sensing of the larger area, with corresponding precoding coefficients, and analyse measurement data acquired on the basis of that sensing. Upon detecting a certain event based on the analysis, the controller may then select a sub-area of the larger area and control the access node(s) to measure the sub-area with corresponding precoding coefficients. Obviously, different precoding coefficients may be associated with different location sizes.

Upon initiating the sensing phase, the NMS 120 may decide which of the ANs 100, 101 is a transmitting AN and which of the ANs 100, 101 is a receiving AN. Then, the NMS 120 may instruct the ANs to perform the sensing for the location. The instructions may include an information element identifying the location. Upon receiving the instructions, the transmitting and receiving AN acquire precoding coefficients for the location, e.g. from the NMS or from an internal memory of the respective AN. The precoding coefficients are then configured to the transmitter and receiver. With the precoding coefficients, the direction of the beam can be focused to the location. The transmitting AN sends a location measurement signal which experiences a distortion due to the object 113 to be measured, provided that the object 113 is present in the location. Receiving AN measures the distorted signal and sends the measurement signal to the NMS. The NMS may then then analyse the measurement signal and determine at least one parameter of the object on the basis of the analysis. The parameter may be an identifier of the object, motion of the object, or a vital sign of the object, for example.

Figure 7:
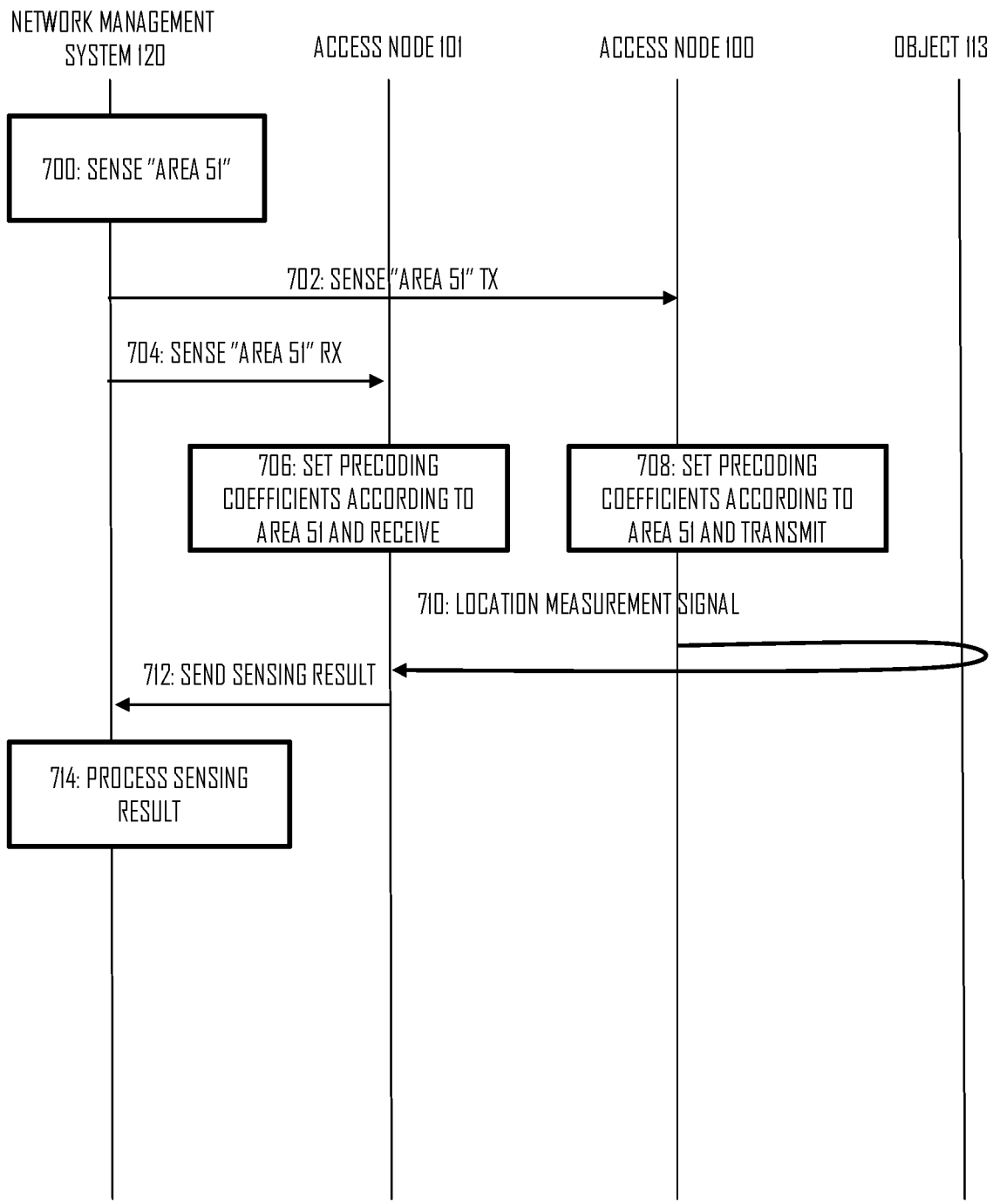

FIG. 7 illustrates the signalling in a case when the AN is sensing a certain location when there is no STA present. The NMS initiates the sensing in block 700, e.g. as a part of application layer operation of the NMS or upon receiving a request from an application processing the location measurement data. In steps 702 and 704, the NMS sends to the ANs 100, 101 a message instructing the ANs 100, 101 to sense a certain location. The location may be identified in the message. The NMS may also indicated in step 702 that the AN 100 is the transmitting AN and in step 704 that the AN 101 is the receiving AN. ANs 100, 101 set the precoding coefficients according to the message and the information on the location to be sensed (blocks 706, 708). AN 100 initiates the transmitting by sending a location measurement signal with the precoding coefficients mapped to the location wherein the object 113 is located, thus directing the location measurement signal to the location. Meanwhile, the AN 101 aligns a reception beam to the location by using the precoding coefficients mapped to the location, thus focusing reception sensitivity to the location. The location measurement signal thus travels from antennas of the AN 100 to the location, gets distorted by the object 113, and travels to antennas of the AN 101 (step 710) Upon receiving the location measurement signal, transmitted by the AN 100 to the location, AN 101 may measure the signal and send the measurement result to the NMS (step 712). NSM then starts processing the measurement signal (block 714).

In an embodiment where the AN 100 or 101 is capable of full duplex communication, the AN may perform the procedure alone and without the help of another AN. In such a case, the NMS 120 may control the AN to perform transmission and reception of the radio signal to and from the location. The AN may configure both the transmission and reception with the same precoding coefficients mapped to the location and receive the signal transmitted by itself to and from the location.

The embodiments of FIGS. 6 and 7 enables the sensing of the location in situations where there is no STA at the location. A STA or another radio transmitter at the location may improve the sensing in the sense that an effect of suboptimal precoding coefficients used in the transmission by the AN is reduced. The radio signal transmitted by the STA is generated at the location and, thus, the radio signal needs not to travel to the location first and get distorted on the path to the location. The transmitting STA might also be located near the location-of-interest. When the STA transmits the signal from a location close to the location-of-interest, the signal might experience distortion during its path from the STA to the measuring/receiving AN but the distortion may be smaller than in a case where an AN further away from the location-of-interest transmits a radio signal to the location-of-interest. The NMS 120 may be capable of monitoring the locations of the STAs and, upon detecting a certain STA at a desired location or sufficiently close to the desired location where the sensing shall be performed, the NMS 120 may configure one or more ANs 100, 101 to set the precoding coefficients to the location and measure a signal received from the STA. This procedure may employ steps 700, 704, 706, 710 to 714 of FIG. 7 with the modification that the location measurement signal is received from the STA in step 710. Steps 702 and 708 may be omitted, as well as step 710 for the AN 100. The NMS 120 may indicate the STA to the AN 101 in step 704. The STA needs not to be connected or associated to the AN 101 to perform the measurement, and the AN 101 may receive and measure any signal transmitted by the STA, by using the set precoding coefficients. The determination of when a STA is sufficiently close to the location may be dependent on the implementation and may be defined by setting one or more thresholds or rules defining the sufficient proximity to the location.

Figure 8:
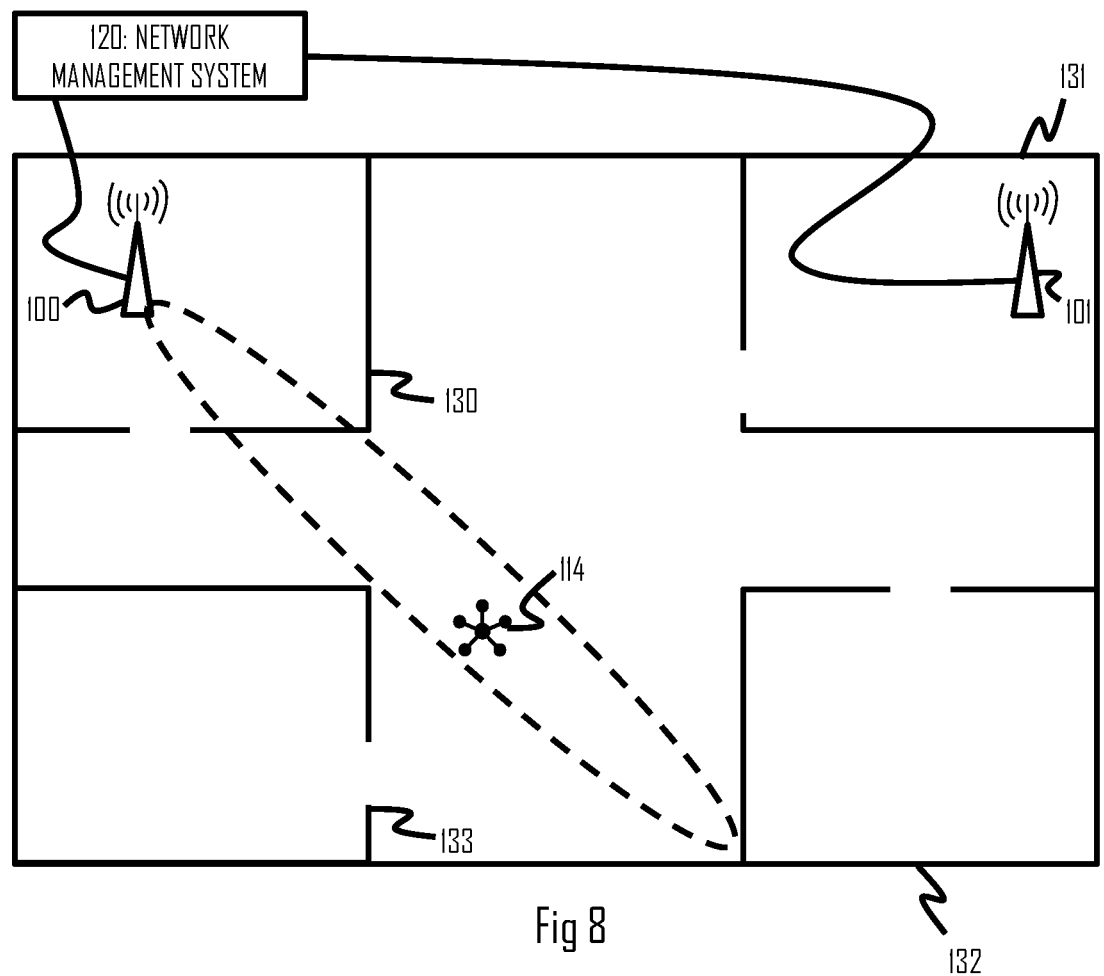
FIGS. 8 and 9 illustrate an embodiment for performing sensing directed to a location in a situation where there is a wireless device at the location.

FIG. 8 illustrates another example where a device is located at the desired location. The device may be a static sensor device disposed at the location.

Developments in 802.11 work groups have involved introduction of a new low-power radio interface called a wake-up radio (WUR). One purpose of the new radio interface is to enable further power-savings by allowing a main radio (also known as a primary connectivity radio) interface used for data communication according to 802.11 specifications to be turned off. The low-power radio interface is called a wake-up radio (WUR) receiver or a low-power WUR (LP-WUR) receiver, and it is considered to be a companion radio to the main radio interface providing primary connectivity. A wireless device such as the STA or an access node may comprise both the WUR and main 802.11 interface. An access node may comprise a wake-up transmitter and the main 802.11 interface. It has been proposed that the purpose of the wake-up radio interface is only or mainly to wake-up the main radio interface of a dozing station when the access node or another station has data to transmit to the dozing station.

The wake-up radio interface may be designed such that it consumes less power than the main radio interface. The wake-up radio interface may employ a simpler modulation scheme than the main radio interface, e.g. the wake-up radio interface may use only on-off keying (OOK) while the main radio interface uses variable modulations schemes such as phase-shift keying (PSK) and (quadrature) amplitude modulation (QAM).

Since the main purpose of the wake-up radio interface is to wake up the main radio interface, the wake-up radio interface may be powered on when the main radio interface is powered off. A wake-up radio interface of the STA may be configured to receive and extract wake-up signals (WUS) or wake-up frames (WUF) transmitted by a wake-up radio interface of the access node or another STA. The wake-up radio interface of the STA may be capable of decoding the wake-up radio frames on its own without any help from the main radio interface. Accordingly, the wake-up radio interface may comprise, in addition to a radio frequency front-end receiver components, digital baseband receiver components and a frame extraction processor capable of decoding contents of a wake-up radio frame. The wake-up radio frame may comprise a destination address field indicating a STA that should wake up the main radio interface, and the frame extraction processor may perform decoding of the destination address from a received wake-up radio frame and determine whether or not the destination address is an address of the STA of the frame extraction processor. If yes, it may output a wake-up signal causing the main radio interface to wake up for radio communication with an access node.

Figure 9:
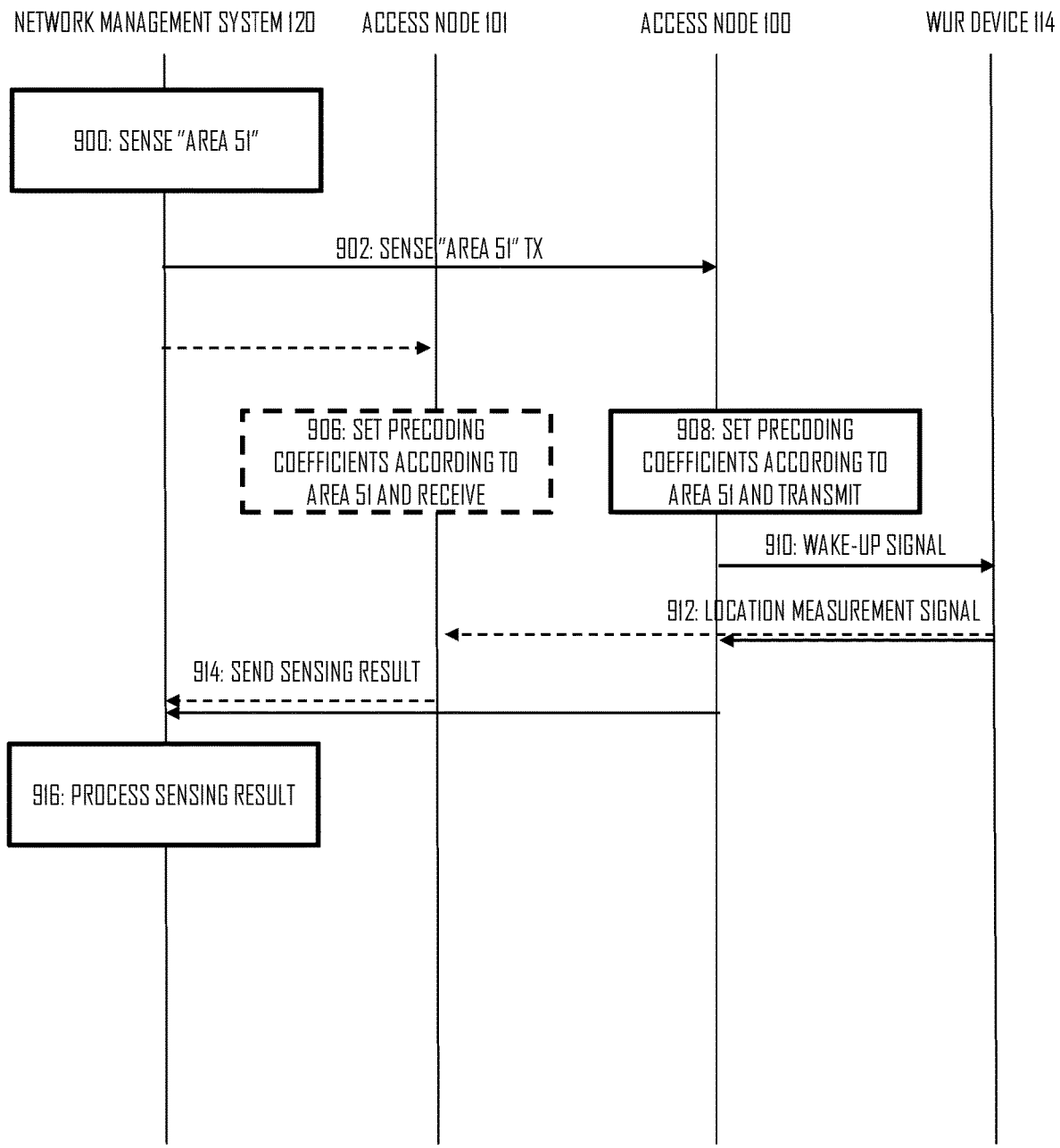

In the embodiments of FIGS. 8 and 9, such a WUR device 114 may be disposed at the location. Similar devices may be disposed in other locations in the area as well. The above-described learning phase may be carried out with the WUR devices when the WUR devices have been installed at the locations. The WUR device 114 is thus an embodiment of the above-described STA.

In the FIG. 8, the NMS may control the acquisition of information from a certain location where the WUR device is located. In this case, since the WUR device is at the location and is capable of transmitting a radio signal that can be measured by an AN, only one AN is needed for the sensing. However, multiple ANs can be configured to receive the radio signal from the location in this embodiment as well as in the above-described embodiments. Such a multi-receiver technique provides more measurement data from the location, thus improving the accuracy of the analysed parameter(s) of the object(s) determined on the basis of the measurement data.

In the embodiment of FIG. 8, the same AN 100 may be configured to transmit a wake-up signal that wakes up the WUR device 114 and to receive a location measurement signal transmitted by the WUR device 114 woken up by the AN 100. The wake-up signal may be transmitted by using the precoding coefficients mapped to the location of the WUR device, or omni-directional transmission may be used. Upon transmitting the wake-up signal, the AN 100 may switch to a reception mode where the location measurement signal is received by using the precoding coefficients mapped to the location of the WUR device 114.

FIG. 9 illustrates the signalling in a case when the AN is sensing a certain location when there is a STA present. The NMS initiates the sensing upon detecting a determined event that triggers the sensing (block 900) and by sending to one or more ANs 100, 101 message to sense a certain location where a WUR device is present. The message may be sent only to one access node, e.g. the AN 100, but it can be sent to one or more other access nodes to acquire more measurement data on the location. The NMS may indicate the WUR device in the message, e.g. by an identifier of the WUR device 114, or the ANs may store information on the locations of the WUR devices in the area. Upon receiving the location information in the message, the AN(s) may determine the WUR device at the location. AN(s) 100, 101 then set the precoding coefficients according to the message (blocks 906 and 908).

In step 910, the AN 100 transmits a wake-up signal to the WUR device 114. The wake-up signal may comprise a waveform or an identifier unique to the WUR device 114 so that only the WUR device amongst the multiple WUR devices in the area wakes up. Upon receiving the wake-up signal, the WUR device 114 enables its main radio interface to transmit a location measurement signal in step 912. Meanwhile, the AN(s) 100, 101 have tuned their receiver towards the location of the WUR device by using the precoding coefficients and, as a consequence, the location measurement signal is received in step 912 by the AN(s) 100, 101. Upon receiving the measurement signal, the measurement data acquired from the measurement signal may be delivered to the NMS 120 for analysis (step 914), and the NMS may perform the analysis of the measurement data (block 916).

In FIG. 9, dashed lines refer to optional steps, i.e. the use of multiple ANs to receive the measurement data is an optional feature. However, in an embodiment one AN may transmit the wake-up signal while another AN receives the location measurement signal. Both ANs may use the precoding coefficients mapped to the location of the WUR device 114 in the transmission/reception.

Above, some embodiments have been described where the NMS or another controller triggers the sensing phase. In other embodiments, the access nodes are configured to sense the location(s)-of-interest regularly, e.g. periodically. The ANs may agree on the periodicity and the transmitting and receiving roles for the sensing for each location, or the NMS/controller may perform the configuration. Accordingly, the sensing may be carried out between the normal operation of the ANs such that the sensing is performed between normal communication between the ANs and STAs located in the area.

Figure 10:
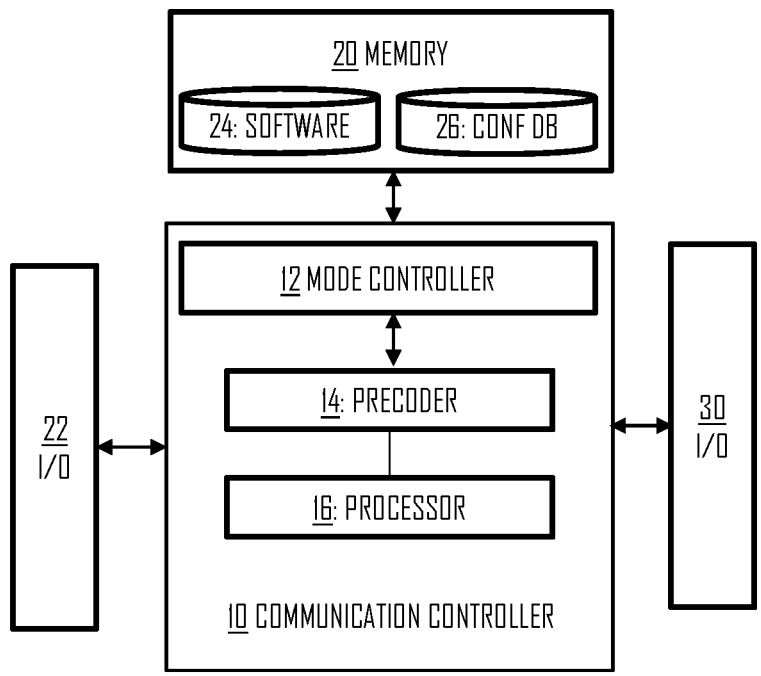
FIGS. 10 to 11 illustrate block diagrams of apparatuses according to some embodiments.

FIG. 10 illustrates an embodiment of a structure of the abovementioned functionalities of an apparatus executing the functions in the process of FIG. 2 or any one of the embodiment described above for sensing the location-of-interest. The wireless device illustrated in FIG. 10 may be the access node 100 or 101. In another embodiment, the apparatus carrying out the process of FIG. 2 or any one of its embodiments is comprised in such a wireless device, e.g. the apparatus may comprise a circuitry, e.g. a chip, a chipset, a processor, a micro controller, or a combination of such circuitries in the AN 100 or 101. The apparatus may be an electronic device comprising electronic circuitries for realizing some embodiments of the wireless device.

Referring to FIG. 10, the apparatus may comprise a first communication interface 22 or a communication circuitry configured to provide the apparatus with capability for bidirectional communication with stations over a radio interface. The communication interface 22 may comprise radio frequency circuitries for processing received control frames and data frames and control frames and data frames to be transmitted. The communication interface 22 may comprise standard well-known components such as an antenna array, amplifier, a filter, a frequency converter, and encoder/decoder circuitries. The communication interface 22 may comprise circuitries for processing messages described above in connection with steps 200, 202, 204 and 206 for example.

The apparatus may further comprise a second communication interface 30 or a communication circuitry configured to provide the apparatus with capability for bidirectional communication with other networks, e.g. the Internet or another computer network. In some embodiments, the communication interface 30 is used for the communication with the NMS 120. In other embodiments, the access nodes communicate with the NM S 120 over a radio interface through the communication interface 22. The communication interface 30 may comprise standard well-known components such as an amplifier, a filter, and encoder/decoder circuitries.

The apparatus may further comprise a memory 20 storing one or more computer program products 24 configuring the operation of at least one communication controller 10 of the apparatus. The memory 20 may further store a configuration database 26 storing operational configurations of the apparatus, e.g. the precoding coefficients mapped to each of multiple locations in the learning phase.

The apparatus may further comprise the at least one communication controller 10 configured to control the execution of the process of FIG. 2 or any one of its embodiments. The communication controller may control the communication performed by the access node and, additionally, the sensing performed by using the same circuitries used for the communication. Referring to FIG. 10, the communication controller 10 comprise a mode controller 12. The mode controller 12 configures the AN to operate in a communication mode in which the access node transmits and receives radio signals with STAs and, optionally, with other access nodes for the purpose of carrying communication. The mode controller may further configure the AN to operate in a sensing mode where the access node operates as a sensor and performs radio frequency measurements on a determined location-of-interest, as described above. The mode controller 12 may control execution of the learning phase where a precoder circuitry 14 is used to calculate precoding coefficients for multiple locations and to store the precoding coefficients as mapped to each of the multiple locations in the configuration database 26. The precoder circuitry 14 may calculate the precoding coefficients according to the received channel measurement signal. In the sensing mode, the mode controller 12 may configure the precoder to use the precoding coefficients mapped to the location-of-interest in reception of a location measurement signal from the location-of-interest, as described above. A measurement data processor 16 may process the received location measurement signal and to control the transmission of the location measurement data to the NMS via the interface 22 or 30, depending on the embodiment.

Figure 11:
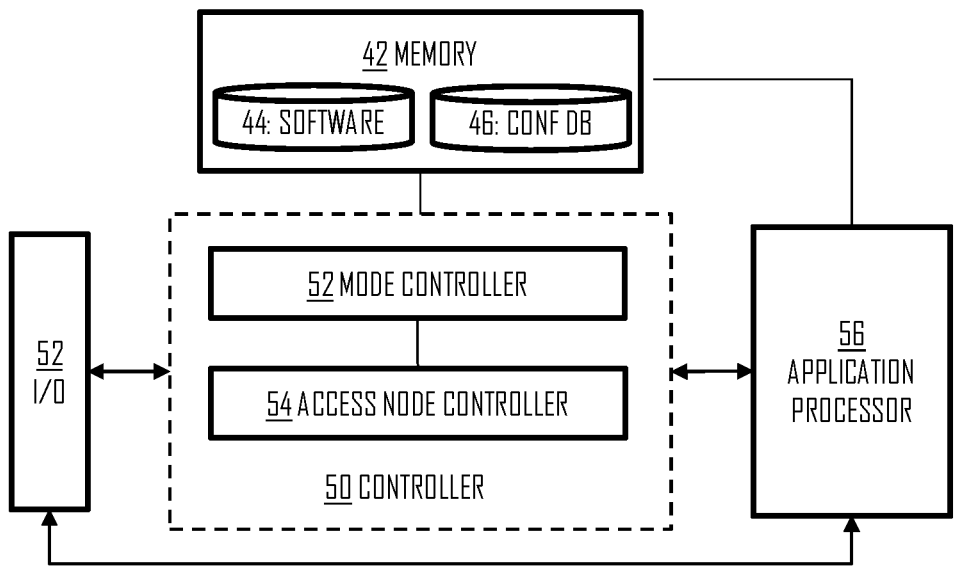

FIG. 11 illustrates an embodiment of a structure of the abovementioned functionalities of an apparatus executing the functions of the controller that may be comprised in the network management system, for example. The apparatus may control the execution of the process of FIG. 3 or any one of its embodiments described above. The apparatus may comprise a communication interface 52 or a communication circuitry configured to provide the apparatus with capability for bidirectional communication with the access nodes. The communication interface 52 may comprise standard well-known components such as an amplifier, a filter, and encoder/decoder circuitries for implementing the wired or wireless connectivity with the access nodes.

The apparatus may further comprise a memory 42 storing one or more computer program products 44 configuring the operation of at least one processor 56 or controller 50 of the apparatus. The memory 42 may further store a configuration database 46 storing operational configurations of the apparatus, e.g. the locations eligible for the sensing and optionally the precoding coefficients for each location.

The apparatus may further comprise an application processor 56 configured to execute a sensing application where the location measurement data associated with one or more locations are analyzed. The application processor may be configured to perform the analysis of the location measurement data and trigger an action on the basis of the analysis (e.g. set an alarm). The application processor may further trigger the learning phase for one or more locations in the area or an update of the precoding coefficients for one or more locations for which the precoding coefficients have been determined but are in need for an update. The application processor may further trigger the start of the sensing phase for one or more locations, as described above. The application processor 56 may be dedicated to the sensing purpose, e.g. it may have no part is managing the network(s) of the access nodes or communicating in the network(s).

The apparatus may further comprise a controller 50 configuring the ANs to carry out the learning phase and the sensing phase according to any one of the embodiments described above. The controller 50 may comprise a mode controller 52 configured to control the switching between at least the learning mode and the sensing mode. The mode controller 52 may then control an access node control to perform corresponding access node control operations that have been described above in connection with respective learning phase and sensing phase. When the mode controller triggers the learning phase for one or more locations, the access node controller may control the access nodes to acquire or update the precoding coefficients for the one or more locations. When the mode controller triggers the sensing phase for a location, the access node controller may control the access nodes to use the precoding coefficients mapped to the location to perform the sensing for the location, as described above. During the sensing phase, when the access nodes transmit the measurement data to the apparatus, the apparatus may receive the measurement data via the communication interface 52, and the application processor 56 may process the measurement data in the above-described manner.

As used in this application, the term 'circuitry' refers to one or more of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention. The processes or methods described in FIGS. 2 to 9 may also be carried out in the form of one or more computer processes defined by one or more computer programs. A separate computer program may be provided in one or more apparatuses that execute functions of the processes described in connection with the Figures. The computer program(s) may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

Embodiments described herein are applicable to wireless networks defined above but also to other wireless networks. The protocols used, the specifications of the wireless networks and their network elements develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. Embodiments are not limited to the examples described above but may vary within the scope of the claims.

The invention claimed is:

1. An apparatus for a wireless network, comprising:
   at least one processor; and
   at least one memory including computer program code, wherein the at least one memory and the computer program code are configured, with the at least one processor, to cause the apparatus to perform the following:
      receiving, from a wireless device at a location, a channel measurement signal;
      determining precoding coefficients for the location based on the channel measurement signal;
      storing the precoding coefficients as linked to the location; and
      utilizing, in a sensing phase, the precoding coefficients to sense the location for one or more objects at the location.

2. The apparatus of claim 1, wherein the at least one memory and the computer program code are configured, with the at least one processor, to cause the apparatus to build, by repeating the receiving, determining, and storing for multiple locations of the wireless device or another wireless device, a database mapping different precoding coefficients to the multiple locations.

3. The apparatus of claim 1, wherein the at least one memory and the computer program code are configured, with the at least one processor, to cause the apparatus to perform the utilizing by setting the precoding coefficients to at least one of a transmitter and a receiver in order to direct a radio beam to the location.

4. The apparatus of claim 1, wherein the at least one memory and the computer program code are configured, with the at least one processor, to cause the apparatus to acquire the information on the location when there is no wireless device detected at the location.

5. The apparatus of claim 1, wherein the at least one memory and the computer program code are configured, with the at least one processor, to cause the apparatus to acquire the information on the location by using a signal received from a transmitter at the location.

6. The apparatus of claim 5, wherein the at least one memory and the computer program code are configured, with the at least one processor, to cause the apparatus to wake up the transmitter to transmit the signal.

7. The apparatus claim 1, wherein the at least one memory and the computer program code are configured, with the at least one processor, to cause the apparatus to acquire the location of the wireless device by using a positioning system.

8. An apparatus for controlling a wireless network, comprising:
   at least one processor; and
   at least one memory including computer program code, wherein the at least one memory and the computer program code are configured, with the at least one processor, to cause the apparatus to perform the following:
      controlling at least one access node of the wireless network to carry out a learning phase where the at least one access node receives, from at least one wireless device in at least one location, at least one channel measurement signal, determines precoding coefficients for the at least one location based on the at least one channel measurement signal, and stores the precoding coefficients as linked to the at least one location; and
      controlling the at least one access node to carry out a sensing phase where the precoding coefficients are utilized to acquire information on the at least one location.

9. The apparatus of claim 8, wherein the at least one memory and the computer program code are configured, with the at least one processor, to cause the apparatus to acquire, from the at least one access node, information on the at least one location for which the precoding coefficients have been determined, to determine to sense the at least one location for one or more objects in the at least one location, and to perform the controlling the at least one access node to carry out the sensing phase on the basis of the determination.

10. The apparatus of claim 8, wherein the at least one memory and the computer program code are configured, with the at least one processor, to cause the apparatus to control multiple access nodes to sense a location by setting precoding coefficients of a first access node to transmit a signal to the location and by setting precoding coefficients of a second access node to receive the signal from the location.

11. The apparatus of claim 10, wherein the at least one memory and the computer program code are configured, with the at least one processor, to cause the apparatus to select the first access node and the second access node on the basis of stored information on that both the first access node and the second access node have established the precoding coefficients for the location.

12. The apparatus of claim 8, wherein the at least one memory and the computer program code are configured, with the at least one processor, to cause the apparatus to cause the at least one access node to acquire the information on the location when there is no wireless device detected at the location.

13. A method for an access node of a wireless network, comprising:

receiving, by the access node from a wireless device at a location, a channel measurement signal;

determining, by the access node, precoding coefficients for the location based on the channel measurement signal;

storing, by the access node, the precoding coefficients as linked to the location; and utilizing, by the access node in a sensing phase, the precoding coefficients to sense the location for one or more objects at the location.

14. A method for controlling a wireless network, comprising:

controlling at least one access node of the wireless network to carry out a learning phase where the at least one access node receives, from at least one wireless device in at least one location, at least one channel measurement signal, determines precoding coefficients for the at least one location based on the at least one channel measurement signal, and stores the precoding coefficients as linked to the at least one location; and controlling the at least one access node to carry out a sensing phase where the precoding coefficients are utilized to acquire information on the at least one location.

* * * * *